United States Patent

[11] 3,528,364

[72] Inventor William G. Freund
Bordentown, New Jersey
[21] Appl. No. 747,571
[22] Filed July 25, 1968
[45] Patented Sept. 15, 1970
[73] Assignee Munro Systems Corporation
Huntingdon Valley, Pennsylvania
a corporation of Pennsylvania

[54] BALE TYING METHOD AND APPARATUS
13 Claims, 13 Drawing Figs.
[52] U.S. Cl. ................................................ 100/3,
100/11, 100/17, 100/192, 100/219
[51] Int. Cl. ............................................. B65b 13/28
[50] Field of Search ..................................... 100/22,
175 (Cursory), 2, 3, 8, 17, 31, 19, 11, 179, 219, 192;
140/93.6

[56] References Cited
UNITED STATES PATENTS
711,480 10/1902 Curry ............................ 100/11X
949,857 2/1910 Sweeney ........................ 100/11
1,004,555 10/1911 Brooks .......................... 100/11
1,889,372 11/1932 Nolan ............................ 100/31X
1,990,526 2/1935 Claar et al. .................... 100/11
2,595,503 5/1952 Altgelt ........................... 100/30X FOREIGN PATENTS
1,016,781 1/1966 Great Britain ............ 100/11

Primary Examiner—Billy J. Wilhite
Attorney—Paul Maleson

ABSTRACT: A method and apparatus for use with a baling machine for automatically tying bales of compressed shredded material formed by the baling machine. Spools of wire are provided on each side of the baling machine and the wire runs from a spool on one side to a corresponding spool on the other. A wire carrier carries a plurality of strands of wire through ports in the baling machine ram across the face of the ram. A twisting mechanism twists together the wire on side of the bale and the wire carried across from the other side of the bale to form two twisted ties. A cutting mechanism cuts the wire between the ties. The wire carrier returns to its original position.

Patented Sept. 15, 1970
3,528,364
Sheet 1 of 5
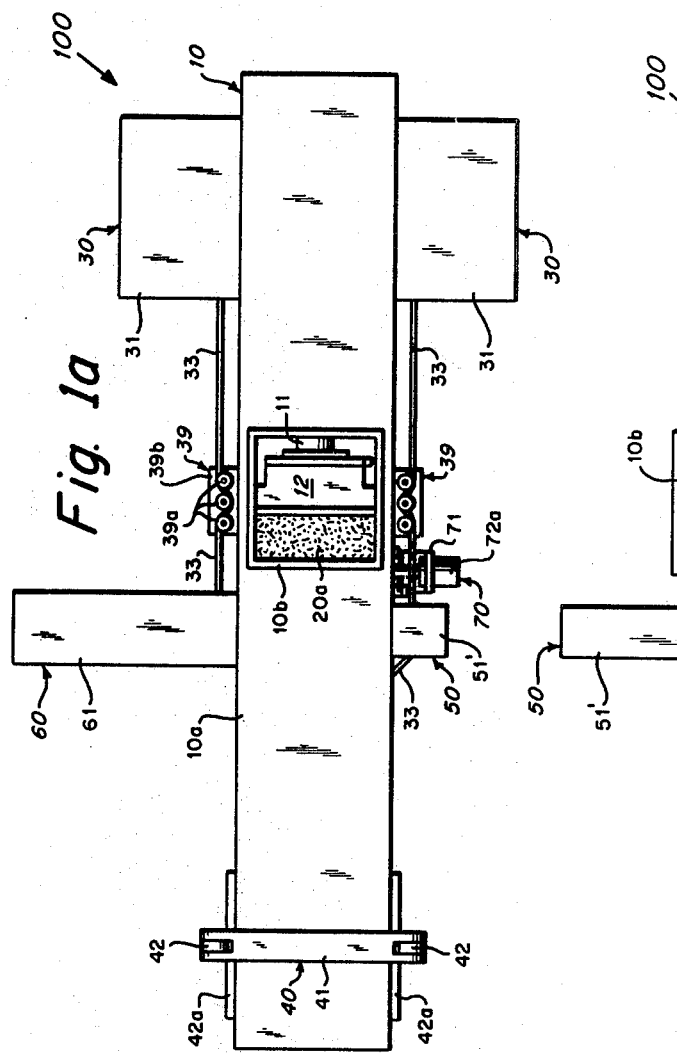
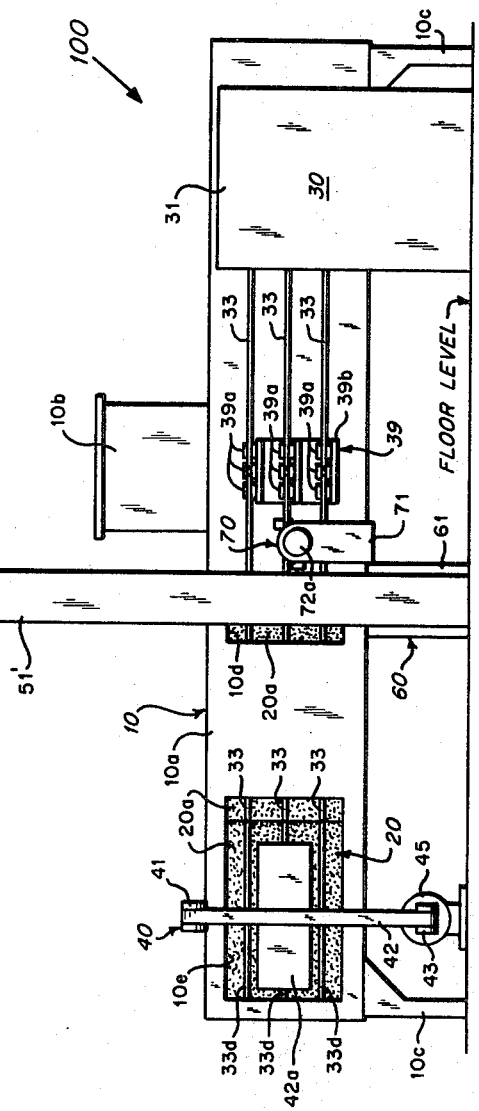
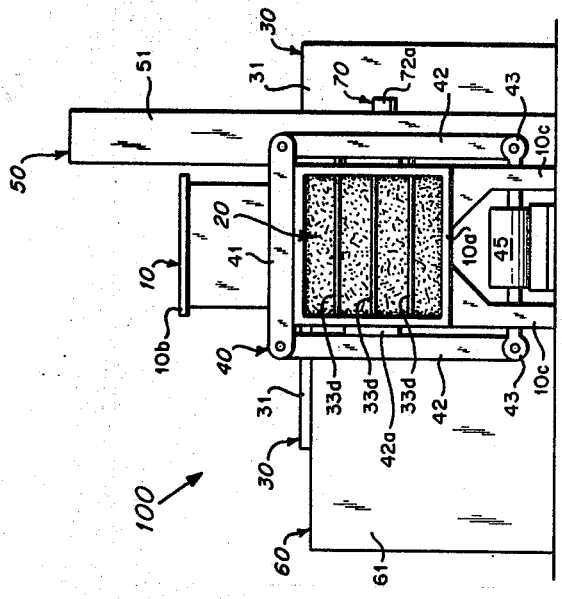
INVENTOR.
WILLIAM G. FREUND
BY
Paul Maleson
ATTORNEY

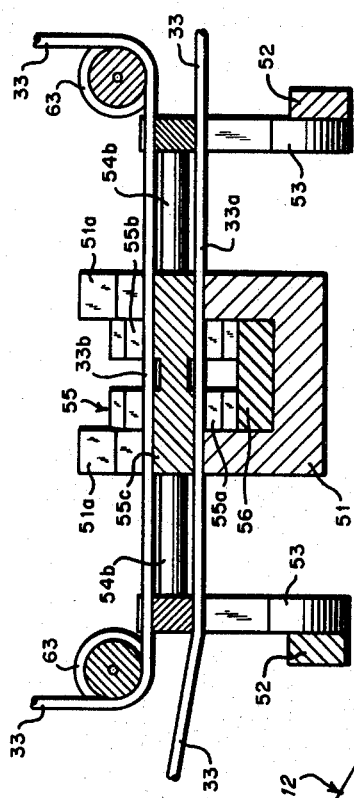
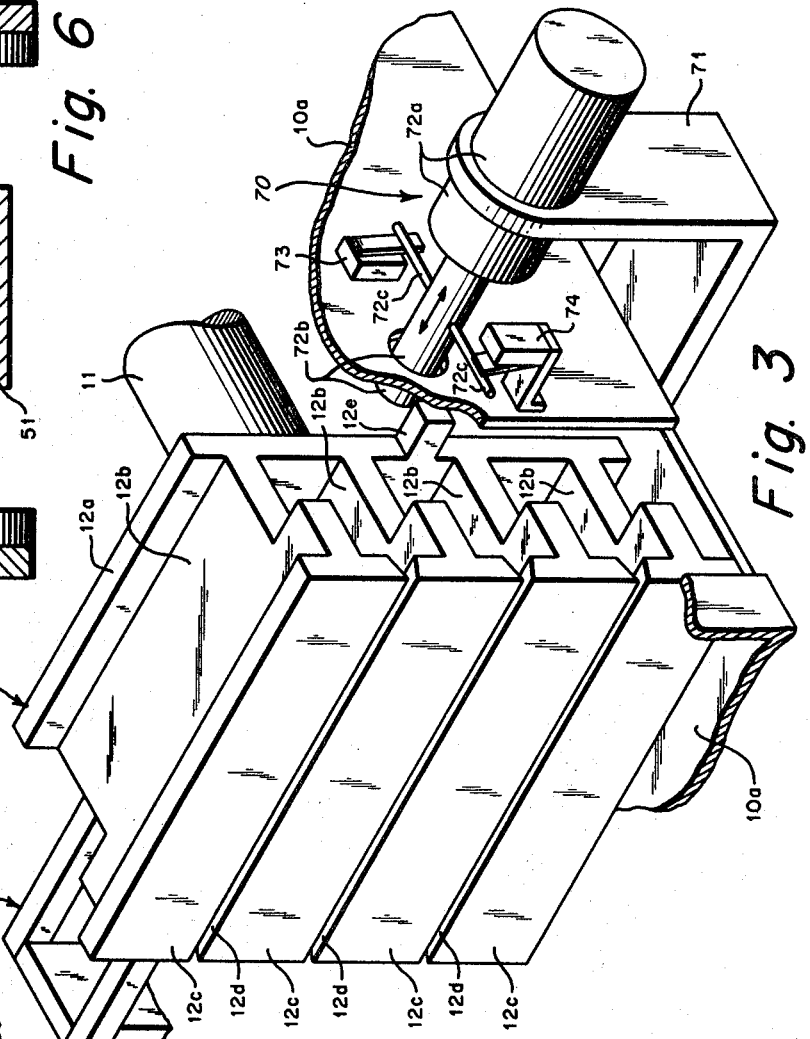
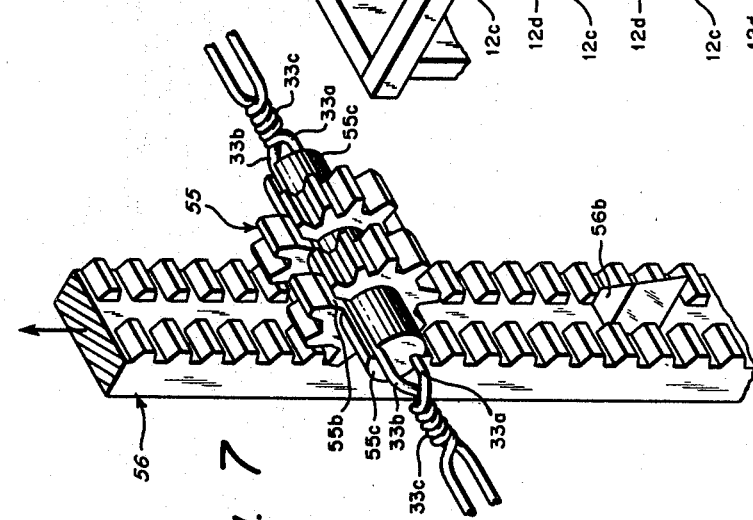

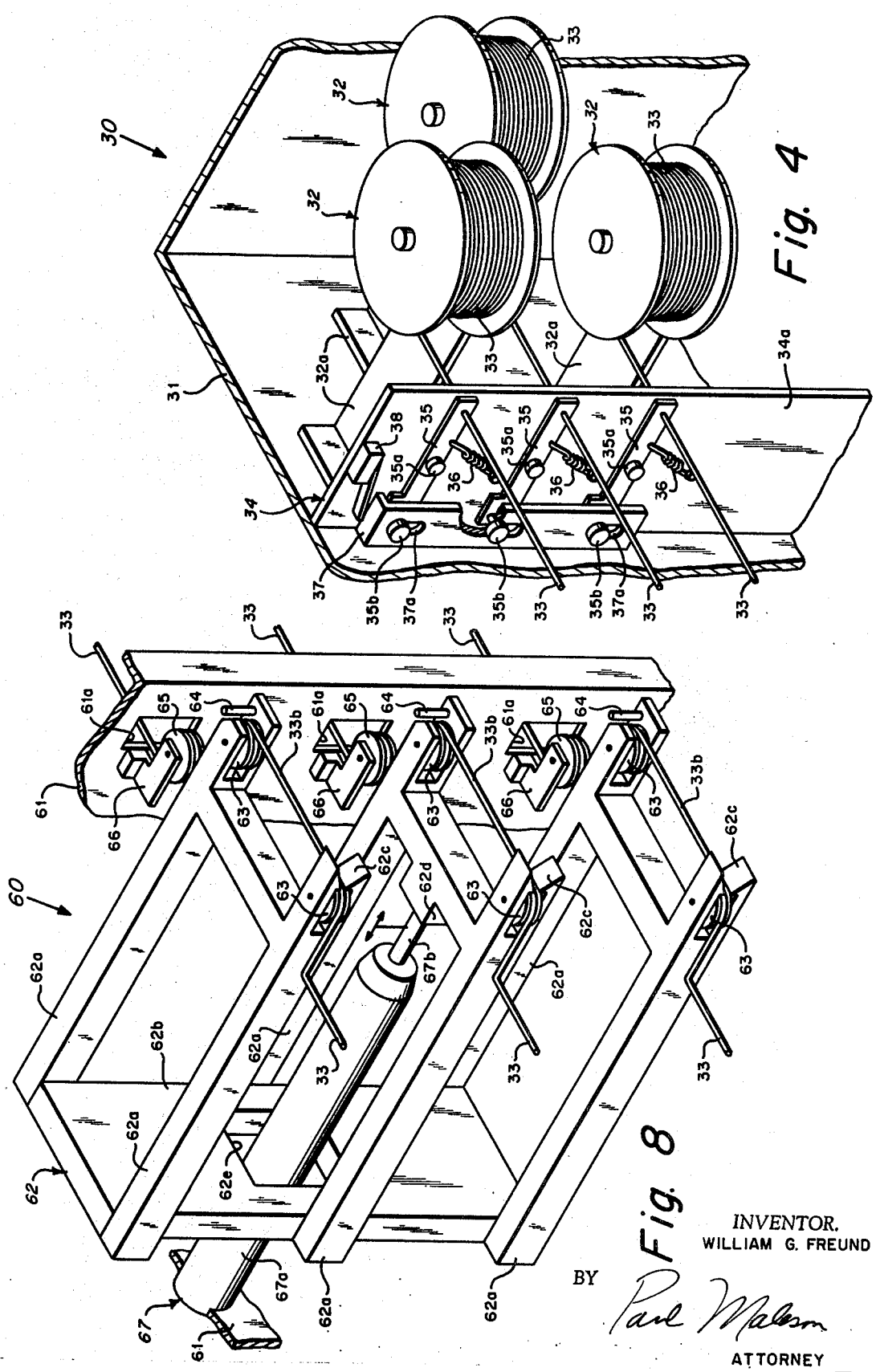

Patented Sept. 15, 1970 3,528,364

INVENTOR.
WILLIAM G. FREUND
BY Paul Maleson
ATTORNEY 3,528,364

BALE TYING METHOD AND APPARATUS

BACKGROUND OF THE INVENTION

1. Field of the Invention

This invention relates to the baling art. More particularly, it relates to the non-agricultural baling art and industry in which shredded or otherwise divided materials are compressed into bales. Typically, the field of application lies in the handling of waste paper and paper-type products. These materials are shredded into fragments considerably larger than powder or particle size, but very small in comparison with the over all dimensions of the bale. The bales produced in the art to which this invention has particular application typically have dimensions on the order of three feet square transversely and about six feet longitudinally, and the bales generally have a rectangular shape. Typically, the materials to be baled are assembled, shredded, conveyed by an air conveyor or other system and are fed into the hopper or receiver of the baling machine. The particular field for which this invention was initially developed utilizes horizontal type baling machines.

Horizontal baling machines of this class generally comprise a hopper, a baling chamber and ram actuated through the chamber. There are many types of accessory equipment which may be incorporated, either directly or indirectly, with such baling machines. For instance, one such type of equipment is apparatus to automatically insert bale dividers between the bales, such as is disclosed in co-pending U.S. Pat. Ser. No. 638,498, entitled "Bale Divider Inserter," now U.S. Pat. No. 3,420,161 which issued Jan. 7, 1969.

The apparatus and method of the present invention is in a broad sense usuable as an accessory piece of equipment with baling machines. However, a baling machine must have certain structural elements and characteristics, since parts of the baling machine proper cooperate with the tying apparatus. Thus, in one sense, it may be said that this bale tying apparatus is necessarily in combination with a baling machine.

2. Description of the Prior Art.

In the agricultural arts, there has been a long development of machinery which includes apparatus for baling crops and tying them. These methods and structures have developed in particular response to the problems encountered in agriculture and the solutions of the problems are not casually adaptable to the problems of baling industrial type shredded waste products. For example, the compressive forces exerted on materials baled in agricultural fields are typically much less than those which are desirable in the industrial applications involving large horizontal baling machines. Thus, the development of the tying apparatus and methods in the agricultural field do not carry over directly to the present application.

There has been a line of development of so-called "strapping machines", which are powered devices for tying the metal straps or wires which have been placed around bales by other means. U.S. Steel Supply Company, division of United States Steel Corporation, for example, supplies such equipment. Such equipment is not automatic in the sense that the present invention is. That is, the present invention contemplates the completely automatic positioning of wires around the bale, tying, and cutting, whereas the strapping machines perform only a part of this overall function and are not necessarily suitable for casual incorporation in the overall automatic operation which presents somewhat problems.

There have been prior expedients to combine the baling structures as described with strapping, banding or tying structures. Such earlier apparatus are disclosed for example in U.S. Pat. Nos. 2,768,574 and 2,827,926. There have been individual lines of development of specific elements of the over all automatic apparatus and method, such are exemplified in U.S. Pat. Nos. 2,763,297 and 2,853,885.

SUMMARY OF THE INVENTION

A horizontal baling machine of conventional general construction except as specifically modified as described below, is provided. A plurality of reel or spools of baling wire is provided on one side of the machine, and a corresponding number of reel or spools are provided on the other side of the machine. From each spool on one side to its corresponding spool on the other, a strand wire passes, disposed horizontally, and traversing the exit orifice of the baling chamber of the baling machine. The plurality of wires are arranged in one vertical plane and are parallel to each other.

A wire carrier assembly is provided at one side to carry the wires across the baling chamber. The ram of the baling machine is provided with transverse ports through which the wire carrier may pass. The wire carrier carries wire from one side of the machine through the ports in the ram, behind the bale being tied off, and into a wire tying and cutting apparatus. The wire carrier assembly also retracts to its original position, keeping the wire taut across the chamber as it retracts, in preparation for the start of a new bale formation.

In addition to the ram having internal horizontal ports, the vertical side frames of the baling machine also are provided with ports to provide a path of travel for the wire carrier.

The baling machine generally operates in a conventional manner as if it were not provided with the present invention. As a bale is formed by the successive operating strokes of the ram, it moves forward out of the baling chamber and presses against the wires. The wire unwinds from the supply rolls on both sides. When the bale length control means indicates that a bale has been made to a desired length, the ram is positioned so that its horizontal ports align with the ports in the side of the vertical side frames of the machine, which is the forwardmost position of the ram. The wire carrier then carries the baling wires from one side across into the wire tying and cutting apparatus and into close juxtaposition to the corresponding wires on the other side.

A twisting apparatus may make about three and one half twists in each strand of wire to be united, resulting in two functions. One is the tying off of the bale and the other is the rejoining of the wires for the formation of a new continuous loop between corresponding rolls on opposite sides of the machine.

The parallel and vertically displaced strands of wire have their twists formed simultaneously by the twisting mechanism. Then, the cutting mechanism cuts the connection between each of the twists on each strand. In general, it may be said that these cuts are made at the same time, but the exact method and apparatus for making the cuts is of a specific type that actually makes all the necessary cuts not exactly simultaneously.

The newly joined loops of wire between the rolls are then held in contact with the retracting wire carrier and the baler is then in condition for a restart of the over-all cyclic baling operation.

An advantage of this automatic bale tying method and apparatus is in reducing the cost of the over-all baling operation. It does this by replacing the existing generally used partly manual tying operation by a completely automatic tying operation. This results in the elimination of operating personnel and also in the reduction of over-all baling time due to the elimination of time lost during the tying off step. Thus, the over-all effective baling capacity of the baling machine is increased. Previously known expedients to carry out these functions have been attempted, but it is believed that the present invention is an improvement over these earlier attempts, and that at the time of this invention, no fully automatic bale tyer in this field was commercially marketed.

Another advantage of the present invention is that the bales are tied while they are in the baling chamber of the baling machine. Other expedients have involved the baling, strapping, or tying of the bale at a location remote from the place of formation of the bale, and this previously known expedient is not as efficient.

Another advantage resulting from this invention is due to the bales being tied while they are still under compression in the baling machine. A bale of moist pulp will expand about 50 percent after it emerges from the baling chamber. Therefor, when the bale is tied while it is in the baler and under compression, a denser bale for transport is produced and this results in transportation savings. The advantages of high density baling and tying are becoming commercially more important, and it is found that this invention has applicability to fields such as the baling of rubber impregnated fabrics, carpeting, plastics, textiles, metallic foils, paper dust, woodsaw dust and rubber product waste, as well as paper products.

BRIEF DESCRIPTION OF THE DRAWINGS

FIG. 1a is a plan view of a horizontal baling machine provided with tying apparatus;

FIG. 1b is an elevation view taken of the right side of the baler and tying apparatus;

FIG. 1c is an elevation view taken from the bale exit end of the baling machine and tying apparatus;

FIG. 3 is a perspective view, partially fragmented, of the baling machine ram and the ram locking mechanism;

FIG. 4 is a perspective view, partially fragmented, of a set of wire wheels on one side of the baling machine and the empty reel detecting mechanism;

FIG. 6 is a cross-sectional view of one of the wire twisting elements, taken along line 6—6 of FIG. 5c;

FIG. 7 is a perspective view of one of the wire twisting mechanisms with relation to its actuating rack, and FIG. 8 is a perspective view of the wire carriers for all of the wires, and the actuating mechanisms therefor.

DETAILED DESCRIPTION OF THE INVENTION

Figure 2B:
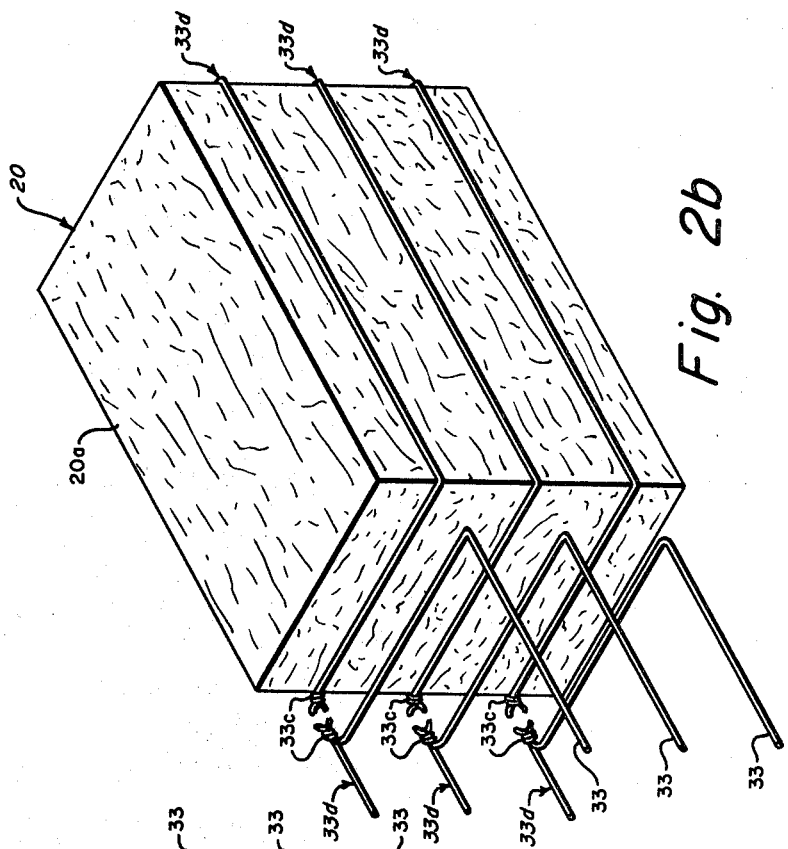
FIG. 2b is a perspective view of the formed bale after the tie wires have been twisted and cut.

The over-all baler and tyer combination is generally designated by reference numeral 100. The general over-all structure and organization of the baler and tyer are best shown in FIGS. 1a, 1b, and 1c. A horizontal baler of generally conventional construction and operation is generally shown at 10. As has been explained, certain modifications must be made in the conventional horizontal baler to make it operable in coacting operation with the tying apparatus, and these modifications are explained in the course of the detailed description. The baler 10 is provided with a baling chamber 10a. A chute 10b provides an access from above to the interior of the baling chamber 10a and is the means by which material to be baled is introduced into the machine. The main structure of the baler is supported on a floor or other operating surface by baler leg members 10c. Apertures or ports in the sides of the baling chamber to permit the passage of the wire carrier, as will be more fully described below, are shown at 10d and 10e.

The baling ram, generally designated 12, is shown as visible from above through the opening of the chute 10b, as best seen in FIG. 1a. It is provided with a ram cylinder shaft 11 which is turn coacts with a ram actuating cylinder, generally an hydraulic cylinder. Further details of the ram are best seen in FIG. 3. The forward head of the ram, that is, the structure that is forced into contact with the material to be baled, comprises a back plate 12a. This back plate is provided with a plurality of horizontal forward extensions 12b which terminate in vertically oriented face plates 12c. The spaces between the plurality of face plates 12c are a plurality of horizontal parallel slots 12d, spaced apart from each other in the same vertical plane.

The back plate 12a is further provided with a locking lug 12e, which has a function described further below. The spaces between the horizontal forward extensions 12b define the horizontal ports through the ram which have been referred to above. These ports permit the passage of the wire carrier in a manner to be described. The slots 12d permit the passage of wire through the forward face of the ram in a manner to be described. This particular structure of the operating head of the ram is a modification from the ram structure provided in conventional baling machines.

The general operation of the conventional horizontal baler is described immediately below to aid in understanding the present invention.

Paper in shredded form or other material to be baled is delivered to the baling machine by pneumatic or other conveying. The shredded paper is delivered to the baling machine by means of a vertical duct commonly called the load chute. When the paper inside the baling chamber of the baling machine and the vertical load chute has reached a height sufficient to break a beam of light which is directed through the load chute, the automatic baling cycle begins.

A horizontally reciprocating ram moves forward, shears off a vertical section of this column of paper, carries the paper forward in its stroke and compresses this paper against the bale which was previously formed and which is still in the baling machine. An electrical limit switch is tripped when the ram has fully extended in its stroke, and the ram automatically retracts. Additional material, although it is in the load chute, cannot enter the baling chamber of the baling machine because the length of the ram is such that it acts as a sliding door while the ram is in the forward position. When the ram has fully retracted the material in the vertical load chute will fall into the baling chamber. If the level of the paper in the load chute is great enough to again break the beam of light the machine will go through the automatic pressing cycle again.

The baling machine will continue to cycle automatically, as material is delivered to the load chute, until a bale is made. A bale is made when an automatic bale length control device as is well known in the art, senses that the bale is of the same length as selected by the operator of the machine on a manually adjustable counter. At this point the machine comes to a stop. That is, the ram ceases to reciprocate, remains in the fully extended or forward position, and so cuts off additional delivery of material from the lead chute to the baling chamber of the machine.

In the conventional baler, using at least partly manual tying, some type of signal, bell, horn or light is usually given to the operator to indicate that a bale has been formed and it is time to tie the bale off. Bales are tied off with wires that are passed through the machine and are tied off so that they lie in a horizontal plane, usually in three or four planes. The operator then presses a "start new bale" button, the ram retracts and the machine can now continue cycling automatically.

In the present invention, instead of this stopping for manual tieing, the tieing and wire cutting steps are performed automatically to the same conventional cyclic control apparatus.

In conventional horizontal balers, the face of the ram, that is, the surface of the ram which bears against the paper while it is being compressed is machined to facilitate passage of the baling wires through the press. This is done by means of horizontally machined grooves in the surface of the ram.

The material comprising the bale, or the material to be baled is indicated in the drawings by numeral 20a. As has been explained, this material can be shredded or otherwise fragmented paper or paper-type materials, or can be of many other types, such as rubber impregnated fabrics, carpeting, rubber product waste, and wood pulp. The present invention is suitable for materials which are relatively elastic or inelastic in the baling art. A completed formed and tied bale 20 is shown in FIG. 2b.

Referring to FIG. 4, the wire spool assembly is generally designated 30. In the preferred embodiment described in detail herein, the bale is tied with three horizontal spaced parallel strands, and all the drawings show this three strand tie. While this is preferable, it is understood that the plurality of ties may differ in their number from three, with the obvious change in the number of elements as required. Thus, FIG. 4 shows the spools on one side of the baling machine, and there are three of them, one to supply wire to each of the three separate strands to be tied. The wire spool assembly is generally provided in a housing 31. The spools 32 are mounted on spool supports 32a. The exact structure of the spools of course is not critical, and any conventional structure which will support the spools and permit rotation is suitable. Each spool contains a wound length of wire 33. This wire is a steel wire which may typically be of 12, 13 or 14 gauge. The exact choice of wire gauge and steel characteristic is a matter of engineering choice for the particular application.

The location of each of the three sets of wire spools 32 with relation to the other elements of the apparatus is best shown in FIGS. 1a and 1b where the wire spool assemblies generally designated 30 are shown, and the strands of wire 33 are shown emerging from the housings 31 on each side. It is seen that the spools are positioned rearwardly of the chute 10b.

The empty spool detector is generally designated 34. It includes a vertical mounting wall 34a. Each of the wires 33 pass through suitable apertures in the wall 34a. For each wire, a pivotable arm 35 is provided. Pivoted for a degree of rotation about pivot pin 35a. Each pivotable arm 35 has a hole near the end thereof through which the strand of wire 33 is threaded. A spring 36 biases the pivotable arm so that if the restraining force of the wire 33 is removed, the arm will rotate around pivot pin 35a in the direction as pulled by the spring 36 which is in tension.

At the end of each pivotable arm 35 opposite to the end through which wire 33 passes, is provided an actuating pin 35b, extending outwardly from the arm 35. A vertically movable switch actuator 37 is provided. The switch actuator 37 is provided with an aperture 37a for each of the actuating pins 35b, and as shown, each aperture 37a is elongated vertically and an actuating pin 35b extends through the aperture 37a. A spool run-out switch 38 is provided on the mounting wall 34a above the switch actuator 37. In the normal operating condition, the switch actuator 37 is out of contact with switch 38, and switch actuator 37 rests freely on the actuating pins 35b. The switch actuator 37 is capable of vertical movement, and if any one of the wires 33 runs out of the hole at the end of its pivotable arm 35, the action of spring 36 will pivot the arm and raise the switch actuator 37 and actuate the spool run-out switch, which in turn stops the operation of the machine so that replacement wire can be supplied.

A tensioning and guide means is provided for each of the wires 33, on each side of the baler 10. These are best shown in FIGS. 1a and 1b as a tensioning guide pulley assembly generally designated 39. This pulley assembly comprises three pulleys 39a mounted on pulley supports 39b. As shown, the set of pulleys for each wire on each side of the machine comprises a set of three pulleys arranged with vertical axes, with the respective axes of the pulleys positioned along the path of the wire 33. The pulleys 39a are free to rotate. It is seen that the wire 33 passes to the outside of the first pulley, to the inside of the second pulley and around the outside of the third pulley. It is understood that all the foregoing description relating to the wire and its associated apparatus is part of the present invention. With continued reference to FIGS. 1a, 1b, 1c, it is convenient to describe the remainder of the illustrated structure which is conventional in horizontal baling machines. A bale restraining means generally designated 40 is provided. This means includes a top transverse bar 41 which is pivoted to vertical side bars 42. Each of the side bars 42 is provided with a side pressure plate 42a. A double acting cylinder, conveniently an hydraulic cylinder 45 is provided below the baling chamber and arranged transversely to the direction of movement of the bales. This restraining means actuating means 45 is provided with cylinder shafts 43 extending from each end thereof and connected at the lower end of vertical side bars 42 with pivoting connections. By operating the cylinder 45 so as to draw the cylinder shafts 43 inwardly, pressure can be exerted on the sides of a bale 20a through the aperture 10e provided in the vertical side wall of the baling chamber 10a.

This above-described bale restraining means provides a resistance to the action of the ram 12 and as greater pressure is applied by this means, more resistance is exerted against the action of the ram and hence the denser is the bale produced. It is understood that there is a fully developed art in providing resistance against ram action in such baling machines and the structure illustrated is merely a simplified functional representation of one such form of restraining means. In general, those features of the conventional baling apparatus which do not directly relate to the important aspects of the present invention are only described and shown in a simplified way or not at all, so as to provide a context for the invention.

The wire carrier or wire traverse mechanism is generally designated 60 and its main structural aspects are best shown in FIG. 8. An actuating means is provided to move the wire carrier, and this is shown in the preferred embodiment as a wire carrier actuator 67 as an hydraulic cylinder. The actuator 67 includes a fixed cylinder body 67a and a moveable cylinder shaft 67b. The entire wire carrier mechanism 60 is mounted in a closed housing 61. It is positioned with respect to the overall arrangement and structure of the baling machine 100 as best shown in FIG. 1a, where it is shown positioned slightly ahead of the chute 10b.

It is understood that many actuators are described in this patent and these are preferably hydraulic cylinders. Such cylinders are very well known in the art, and when reference is made to a shaft in such a cylinder, it is of course understood that the shaft is operably connected to a piston, and that appropriate and known control means and power supply means are provided to actuate the cylinders.

The wire carrier actuation means 67 has a degree of extension and retraction, in the direction indicated by the arrows in FIG. 8, sufficient to carry the ends of the wire carrier completely across the width of the baling chamber.

The wire carrier 60 comprises a traverse frame structure generally designated 62. This frame comprises a back plate 62b and a plurality of single wire carrier elements 62a. As shown in FIG. 8, there are three of the single wire carrier elements 62a, and these are each disposed horizontally and arranged in spaced vertical parallel relationship to each other, with a wire carrier elements 62a corresponding to a single wire 33 and positioned so as to receive the wire without the vertical direction changing. For each wire 33, a wire receiving aperture 61a is provided in the housing 61. Closely adjacent each of the wire receiving apertures 61a is positioned a guide pulley 65 mounted on a pulley bracket 66. Each wire 33 passes partly around its guide pulley 65. It will be understood from the orientation of FIG. 8 and FIG. 1a that the wire carrier is in an almost fully retracted position as shown in FIG. 8 and that when shaft 67b is extended, the wire carrier elements move to the right as shown, and enter the baling chamber of the baler 10. Thus, the wire 33 travels over guide pulley 65 on the side thereof away from the baler, that is, the outside side of pulley 65.

One of the wire carrier elements 62a is described, and it is understood that the other two are identical except that the center one of the two has the wire carrier actuating means connected to it, to simultaneously move all the elements 62a. The single wire carrier element 62a is generally horizontally disposed open rectangular framework connected at its rear portion to the backplate 62b of the traverse frame structure 62. At its forward end, the wire carrier element 62a is provided with two extended portions. Each of these extended portions is provided with a clamping pulley 63. These pulleys are disposed so that the wire 33, after running partly around guide pulley 65 on the outside side thereof, can then be threaded so as to run around each of the successive clamping pulley 63 on the inside side thereof, that is, on the side thereof nearest the baler when the traverse mechanism is in its retracted position. The height of the clamping pulley is such that the wire 33 does not change its height while passing around them.

On the first of the extended portions of the carrier element 62a, a guide pin 64 is provided adjacent the clamping pulley 63 mounted on that extended portion. This guide pin 64 serves to retain the wire 33 in its position partly around the first clamping pulley 63, at all times during the process. The desirability of this guide or retaining pin 64 will become apparent in the further discussion of the operation of the apparatus.

The second extended portion having the second clamping pulley 63 is provided with fork-like wire guides or fingers 62c. These fingers or guides are sloped so as to lead to the pulley 63. Thus, as the wire traverse mechanism 60 starts to move forward, the wire 33 will be guided by the wire guides 62c onto the pulley 63. The function of these wire guides, as well as that of the guide pin 64 is more fully understood in connection with a description of the operation of the apparatus.

The wire carrier actuation cylinder 67a extends through an aperture 62e provided for that purpose in the backplate 62b. The cylinder shaft 67b connects with the center wire carrier elements 62a at a shaft mount 62d.

The structure of the tying and cutting mechanism is now described. It is understood that in the condition before a bale has been started to be formed, the wire 33 is disposed as follows. A single continuous strand of wire 33 comes off its reel 32 on the side of the baler shown at the upper part of FIG. 1a. It then passes through the tension and guide pulley assembly 39 as has been described. It then enters the wire carrier 60. At this stage, the wire 33 passes around the pulley 65 as described and passes between the first pulley 63 and the guide or retaining pin 64. It then extends transversely across the width of the baling chamber 10a of the baler 10. At this stage, the wire 33 has not been guided by the fingers 62c into contact with the second clamping pulley 63. The wire 33 then continues parallel to and rearwardly along the side of the baler through a second guide pulley and tension assembly 39 and thence into the far side wire spool 32.

As the repeated strokes of the ram 12 start to form a bale of material 20a, the material 20a is pushed forwardly in the baling chamber and starts to push against the transverse wires 33 which extend across the baling chamber. It will be apparent that as this pushing continues, the wire strands 33 which originally passed over guide pulley 65 and between clamping pulley 63 and retaining pin 64 will have their direction changed from a directly transverse condition to a condition parallel to the sides of the baler. That is, as the bale starts to be formed, the wire 33 is forced to turn so that it passes through the fingers 62c. The section of wire between the two clamping pulleys 63 is identified as 33b. The operation of the apparatus has been explained to this extent at this point so that it may be understood how the wire gets to the position as shown in FIG. 8 and consequently the operation of the twisting and cutting mechanism can be better understood. FIG. 8 shows the wire carrier slightly advanced from its fully retracted position. When fully retracted, the pulleys 63 and 65 are aligned so that the wire 33 passes therethrough in substantially a straight line as a bale is formed and pushed past the wire carrier. When the carrier has retracted, the wire 33 runs over guide pulley 65, in front of retaining or guide pin 64 and thence directly across the baling chamber. The formation of the bale pushes the wire ahead of the bale in a U-shaped horizontal shape and the wire is thus strung across the carrier, in front of the wire guides 62c. When the carrier 60 starts across the chamber from its fully retracted position, the guide 62c pushes up the wire. The condition is shown in FIG. 8. The sharp bend in wire 33 at the left shows in simplified form the shape of the wire as it extends forward of the carrier and goes around the bale that has been formed ahead of the carrier. The structure and operation of the twisting and cutting mechanism, and its relationship with the wires 33 is best understood in connection with FIGS. 5a, 5b, 5c, 6 and 7. As has been explained, after a full bale has been formed, the ram 12 is held at a position as is shown in FIG. 3, so that the wire carrier structure 62 may move forward to permit the wire carrier element 62a to pass through the ports formed between the horizontal forward extensions 12b in the ram. The structure of the ram to provide these ports has been described.

Figure 2A:
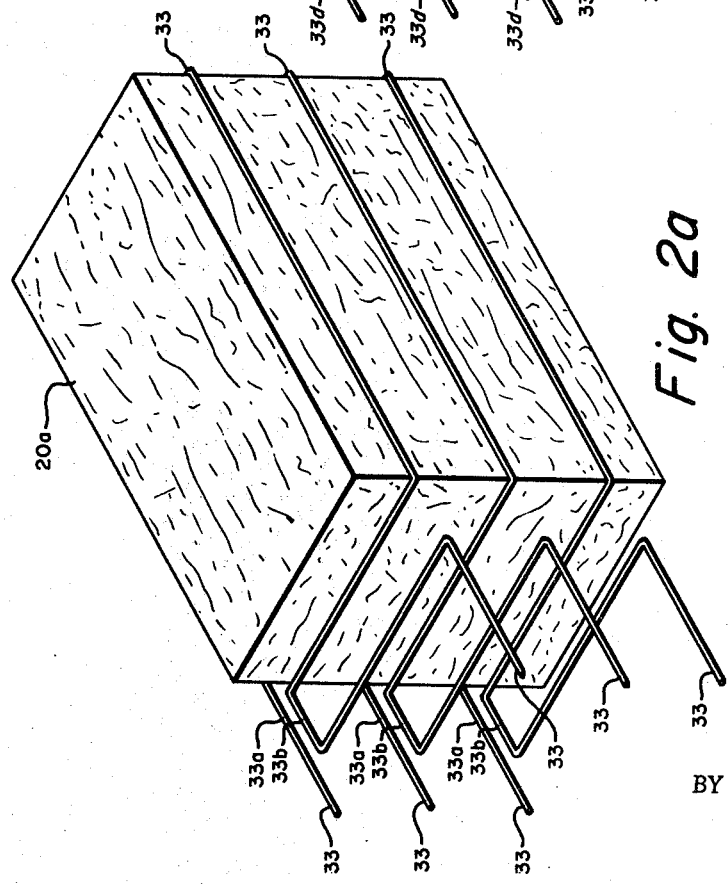
FIG. 2a is a perspective simplified view of a formed bale with the tie wires carried into position around the bales.

It will be appreciated that the stage in operation above described, the wire 33 on the far side of the baler, that is, the bottom portion of FIG. 1a, will also have extended parallel to the sides of the baler across the aperture 10b in the side of the baling chamber. Referring to FIG. 6, it is seen that the clamping pulleys 63 have carried the wire section 33b between those pulleys across the width of the baling chamber so that wire section 33b is parallel to and closely adjacent to, but not touching, a section of the far side wire 33. This far side wire section which is in the immediate twisting and cutting location is identified as secion 33a. Thus, section 33a is the section of the far side wire in the twisting and cutting position or location, and wire section 33b is the section of the first side wire in the twisting and cutting position or location. Reference to FIG. 2a shows schematically the wire section 33a and 33b at this point, with relation to the baling material 20a, which has been formed into the bale and now needs only to be tied to form a complete bale 20.

During the entire portion of the process from the time just before the wire carrier 62 starts to move across the baling chamber, to the time that it has fully retracted to its original position after the completion of the twisting and cutting operation, the ram 12 is locked in the position as shown in FIG. 3. A ram locking mechanism, generally designated 70 is provided to hold the ram with certainty in this position. The ram locking mechanism includes a hydraulic cylinder 72a provided with an extensible cylinder shaft 72b mounted on a support 71. The cylinder and its associated equipment together comprise a ram locking mechanism actuator. The end of the cylinder shaft 72b most remote from the cylinder 72a passes through an aperture provided in the baling chamber 10a and engages the locking lug 12e provided on the ram 12 as has been described. If, as is preferable, the position of the ram as shown in FIG. 3 is fully extended in position, the locking function is achieved by having the cylinder shaft 72b move directly behind the locking lug 12e and prevent any retraction of the ram.

The cylinder shaft 72b is provided with switch actuators 72c extending laterally therefrom. These switch actuators respectively contact limit switches 73 and 74. Limit switch 73 is a ram lock inserted limit switch, and limit switch 74 is a ram lock retracted limit switch.

The major portion of the structure of the twisting and cutting mechanism pertaining to each strand of wire 33 is the same and therefor the structural elements in operation of the structure can be described in connection with one of the wires 33. The twisting and cutting mechanism is generally designated 50. It is enclosed in a housing 51', and the location of the twisting and cutting mechanism 50 with relation to the other elements of the complete baler and tying combination is best shown in FIGS. 1a, 1b, and 1c. It is positioned directly transversely across from the wire carrier mechanism, on the far side of the baler.

The twisting and cutting mechanism 50 comprises a vertically oriented U-shaped channel, with the open portion of the channel facing the wire carrier 60. Inclined guide slot 51a is provided in the legs of the U-shaped channel 51 to guide a wire into other parts of the twisting and cutting mechanism. It is understood that the wire carrier 60 carries the wire 33b into the confines of the guide slot 51a.

Behind the guide slot 51a and in communication with it is an idler gear generally designated 55, arranged for rotation around a horizontal axis parallel to the side of the baler. Gear 55 is mounted on a gear shaft portion 55c which is journaled in bearings for rotation. The bearings are of course provided with a split or gap aligned with the guide slot 51a to permit the wire free entry. The sides of channel 51 may serve as the bearings for the gear or pinion 55. As best shown in FIGS. 6 and 7, the idler gear 55 is bifurcated into two spaced apart idler gear sections with a gap between them so that in one sense the gear 50 may be considered as two gears arranged in axial succession.

The toothed circumference of the gear 55 is interrupted by a pair of dimetrically opposed slots or channels 55a and 55b. Each of these channels 55a and 55b extends through the toothed portions of the gear and into the shaft or body portion 55c. The gear 55 is so positioned within the channel 51 that by rotation thereof, either slot 55a or 55b can be aligned with the guide slot 51a, as is best shown in connection with FIG. 5a.

Wire hooks generally designated 53 are provided as part of the mechanism generally designated 50. One such wire hook 53 is provided for an associated with each idler gear or pinion 55. The structure of the wire hooks is shown in FIG. 5. Each wire hook 53 is provided with an extended finger 53a. Each wire hook is mounted for rotation on pivot shaft 54b, which in turn is mounted in the channel 51.

A vertical actuator bar 52 is provided. Each of the wire hooks 53 is pivotally connected to the actuator bar 52 with pivot pin 54a. The actuator bar 52 is capable of vertical movement, as is shown by the successive FIG. 5. Thus, the wire hook 53 is a lever rocking around its intermediate pivot point 54b when the actuator bar 52 is moved. Actuator 52 is connected to an hydraulic cylinder actuator shaft 52a so that the motion of the cylinder shaft 52a operates the bar 52 and in turn swings the fingers 53a. The actuating cylinders themselves for this and other elements in the twisting and cutting mechanism are not shown, since their structure and control is obvious and in the art and would clutter the drawings.

Also as part of the twisting and cutting mechanism 50, a vertical toothed rack 56 is provided. This rack 56 runs inside the channel 51, as is shown in FIG. 6. It is provided with a parallel pair of toothed rows. Each of the rows of teeth meshes with one of the two bifurcated gear sections 55, as best shown in FIG. 7. As described above, the gear or pinion 55 is an idler, and it is apparent that vertical motion of rack 56 will rotate the gear 55. Rack 56 is connected to a hydraulic cylinder actuating shaft 56a. This cylinder shaft 56a is connected to a hydraulic cylinder of conventional construction and operation.

For each of the pinions 55, the rack 56 is provided with a pair of vertically spaced cutter blades 56b. The cutter blades 56b are provided on the rack between the parallel rows of teeth. In the embodiment shown, there are three pairs of blades 56b, and the pairs are spaced vertically from each other along part of the length of the rack. The extent of projection of each blade 56b is such that it enters well within the split between the gear sections 55 and intersects the line of passage of the wire lying in the grooves 55a and 55b, when the pinion 55 is positioned so that the groove is closest to the rack 56. Further details of the structure are best explained in connection with a detailed description of the operation of the twisting and cutting mechanism.

When the bale is formed, the ram goes to its most forward position, it then trips the limit switch which actuates the ram locking mechanism. The ram locking mechanism then operates and the limit switch indicates that the ram locking mechanism has been fully actuated. At this point, the wire carrier is still in its fully retracted position, and the wire hooks 53 are in the position shown in FIG. 5a. The wire 33a is that section of the wire closest to the twisting and cutting mechanism 50 and is in the approximate position indicated in FIG. 5a.

The actuating mechanism whose shaft 52a is shown, then operates to move actuator bar 52 upwards, thus pivoting the fingers 53a downwardly in a clockwise direction. Each finger 53a contacts its wire section 33a and sweeps it into the inclined guide slot 51a and thence into the pinion groove 55a. It is understood that the many sequential operations described in connection with the twisting and cutting and other mechanisms are all ordered into their proper sequence by the operation of limit switches which senses the position of parts, except where there is a specific other structure described, and this type of machine sequencing is of course common and well known in the art.

Thus, when the fingers 53a have carried the wire section 33a into the grooves 55a, the rack 56 is actuated upward by means of the cylinder shaft 56a for a short distance. The upward travel of rack 56 is just sufficient to rotate each pinion 55, 180° to bring the opposing groove 55b into alignment with the wire guides 51a. The cylinder having shaft 52a continues to exert its upward force on actuator bar 52 so that the fingers 53a continue to follow the wire sections 33a.

Figure 5A:
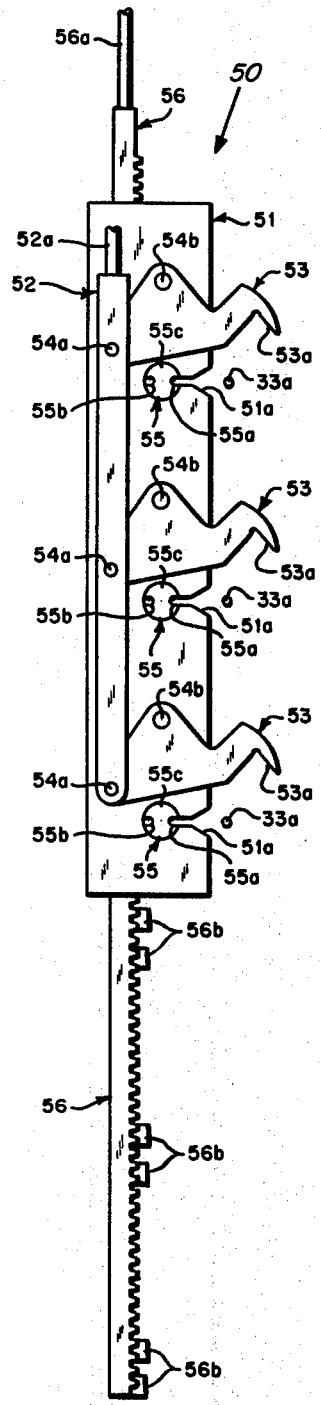
FIG. 5a is an elevation view of the twisting and cutting apparatus before the first wires have been carried into it by the wire hooks.
Figure 5B:
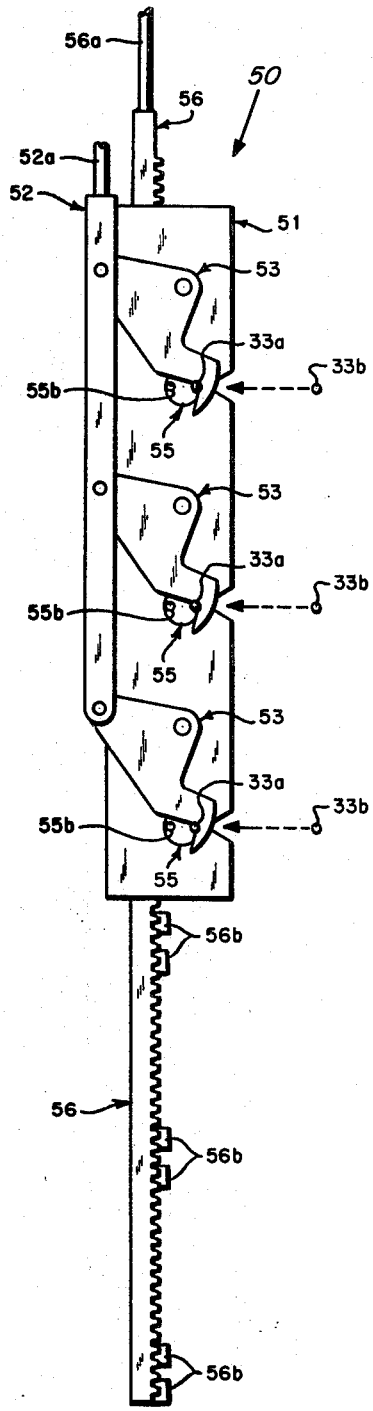
FIG. 5b is a view of the twisting and cutting apparatus after the first wires have been carried into it, and the wire hooks have partially completed their rotation.
Figure 5C:
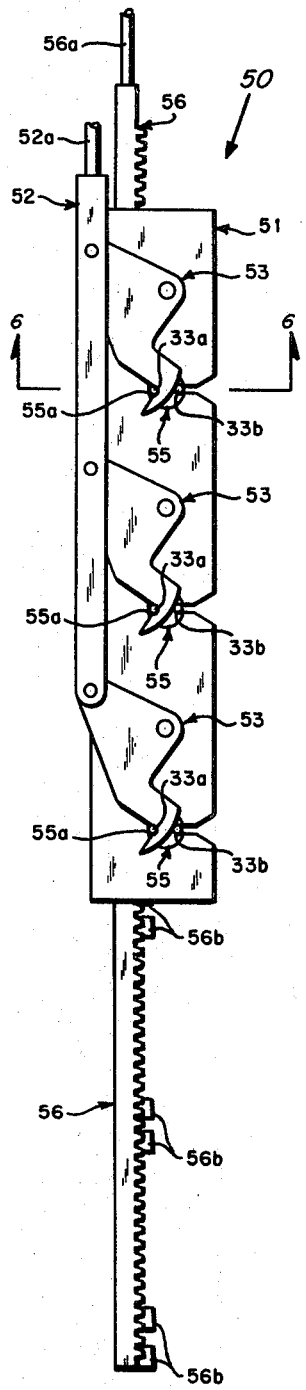
FIG. 5c is the view of the twisting and cutting apparatus after the first wire has been inserted and rotated 180° and the wire carrier has inserted the second wire.

The position of the wire hooks 53, the rack 56, and the pinions 55 at the stage after the 180° rotation has been made is shown in FIG. 5c. At this point however, the wire sections 33b are not yet in the position shown in FIG. 5c although the other elements in that illustration do represent the mechanism at the above-described stage. The wire carrier 60 then starts its traverse of the chamber from its fully retracted position and carries wire section 33b into the groove 55b in the pinion 55. The inclined guide slots 51a help guide the wire sections 33b into the appropriate grooves in the appropriate pinion. While the wire carrier holds wire section 33b in place, rack 56 then resumes its upward motion and makes a complete pass to the top of its compass. In the preferred embodiment, using guage 13 wire, the travel of the rack is sufficient to produce three and one half twists of the wires before any cut is made. Fig. 7 illustrates the location of these twists 33c. It is understood that the wire hooks and associated mechanism shown on one side of the channel 51 is duplicated on the far side thereof, so that each pinion 55 is provided with a wire hook 53 on each side thereof. Referring to FIG. 7, the location of each of the wire hooks with relation to the wire twists can be explained. A finger extension 53a of the wire hooks 53 extends between the wires just to the outside of each of the illustrated two wire twists 33c. That is, a finger 53a is in place between the wire sections 33a and 33b adjacent each of the wire twists 33c and on the side of the wire twists 33c opposite from that side of the wire twist which is closest to the gear 55. It can now be understood that the twists are confined to a small section of the wire by action of the fingers 53a. This produces a tight and controlled twist.

The first part of the final movement of rack 56 makes the twists as described by rotating the pinion. As the rack 56 continues its rise, one member of each pair of cutter blades 56b simultaneously contacts one of the strands of wire, for example, strand 33a, in its position between the bifurcated gear sections 55. Thus, one strand of wire is cut on each of the ties, between the twists 33c, and all of these first strands cuts are made simultaneously. That is, on the embodiment shown, the wire section 33a is cut simultaneously on each of the three shown wire ties around the bale.

The rack continues to rise so as to rotate each of the pinions one more half turn that is, another 180°, and the second cutting blade of each pair of the cutting blades 56b then contacts the remaining strand, that is, strand 33b in its respective pinion. The additional one half turn given to the wire between the two cuts required to completely sever the wire does not really supply an additional twisting because of the first cut. When the rack 56 has reached its upward limit of travel, the condition of the wire is as schematically shown in FIG. 2b. There is a completed wire loop 33d around the bale 20, secured with a twist 33c. There is also completed loop 33d which remains in the baling machine, and connects the spools on each side, also completed with a twist 33c. The loop that remains in the machine is shown at the lower left hand side in FIG. 2b.

When rack 56 has reached its upper limit and the cuts are fully made, the limit switch is activated which initiates the retraction of wire carrier 60. During this action, the rack 56 remains up and the wire hooks 53 remain down. When the wire carrier is fully retracted across the baling chamber, it actuates a limit switch which initiates an unlocking of the ram locking means 70. The ram is thus unlocked, and when the ram unlocking limit switch is actuated by the full retraction of the ram lock, it initiates a withdrawal of the ram 12. When the ram reaches its fully retracted position, it actuates a limit switch which initiates a raising of a wire hook 53 by means of the actuating means for wire hooks 53 as have been described. The raising of the wire hooks 53, that is, their counterclockwise rotation from the position shown in FIG. 5c to the position shown in FIG. 5a, strips the wires out of the pinion grooves 55a and 55b. The entire apparatus has now completed its cycle and is ready for a repetition of the formation of the new bale, with the exception that rack 56 is still in its raised position. The rack can be returned to its low position at any time after the completion of the above-described step, and when it is certain that the twists or splices are out of the twisting and cutting mechanism 50. In the preferred embodiment, the rack 56 is lowered when one half the length of the next bale has been formed. This lowering point is arbitrary as far as the lowering of the rack is concerned, and is merely one convenient way of effecting this final step in the process. It is used because it is convenient in light of other operational aspects of the machine as are described below.

A bale length sensor is provided to sense the length of the bale and indicate when a full bale has been made. Such devices are well known and common in the art, and appear in many earlier patents. For example, a toothed wheel positioned so that it contacts the upper surface of the bale as it is formed, together with means to count the number of rotations of the wheel, comprises a satisfactory bale length sensor. For reasons described more fully below, a second baling counter is added to the sensing mechanism. This counts a half length of formed bale and when this half length has been sensed, a limit switch is activated thereby to initiate a return of rack 56 to its low position. The complete tying mechanism is thus completely reset for the next tie. The half length bale counter is reset by the return action of the rack, and does not function again until another bale has been started. The half bale length sensor may be called the secondary baling counter. Its primary function relates to another preferred aspect of the complete machine. This aspect involves certain specific limitations which make the manual splicing of wires 33 more convenient. It is understood that the structure as described is theoretically operative, but the practical considerations of how to make manual splices of wires more convenient when the wire spools run out have led to the further preferred aspects of the invention.

The wire runout detectors are provided as a means for detecting whenever any wire supply roll is out of wire. It is preferred to have all wire rolls supplied with practically the same length of wire on them. This is desirable because it permits replacement of all wire rolls on the particular side of the machine where the one wire spool runs out. By maintaining an approximately equal length of wire on all supply reels, the number of times that the machine requires attention due to the wire running out on any spool is greatly minimized.

Whenever a wire spool runs out of wire, it is detected by the wire detector, as described above in connection with FIG. 4. However, the machine does not shut down immediately upon the detection. It is highly desirable to make all manual splices of new reels at the same point on the machine. It is, of course, convenient because the operator has a defininte point along the machine frame where he will always splice. It is highly desirable that he make splices at one given point, because it is highly desirable as a practical matter that no splices pass through any of the wire guides, the tieing and cutting mechanism, or the wire carrier mechanism. All manual splices of new wires are made forward of any wire guide or forward of any machine element which comes in contact with the manual splice. Therefore, the wire runout detector is electrically interlocked with the electrical control system so that the machine stops only when the wire which is passing through the machine is in a desirable or allowable condition for manual splicing.

Because the baler cannot be allowed to stop when an automatic tie is being made, or if the last tie which was made has not moved forward far enough to provide physical room for splicing the new wire in, it is desirable to position the wire supply rolls so far to the rear of the machine, that the baler can always make at least one half of bale length after the wire detector has sensed a wire runout. To clarify this, the three possible conditions of operation under which any wire supply roll can run out of wire are described below.

First possible condition: the wire detector senses that a supply roll has run out of wire during the time that the machine is in the automatic tieing cycle. The machine will not stop. It will finish the automatic tieing of the wires, will continue to make approximately one half of a bale, and then will automatically stop. The formation of the half bale length is sufficient to bring the twist ties out of the tieing and cutting enclosure and the wire carrier enclosure, thereby allowing manual splices to be made ahead of and beyond all wire guides.

Second possible condition: the wire detector senses a wire runout anytime after the completion of an automatic tieing cycle. The baling machine will again make a half bale as described above and then will come to an automatic stop.

Third possible condition: the baling machine is making the second half of a bale but the bale length sensor has not indicated that a bale has been made to full length. In this case, the machine will shut down instantaneously upon the receipt of a signal from the wire runout detector.

In all cases, a visible or audible signal is preferably given as soon as the wire detector senses a runout, and continues even after the machine has come to a full stop.

It is understood that the wire runout detection system described above as a preferred embodiment utilizes the runout system described in connection with FIG. 4, but is somewhat sophisticated in its functional control. Use of this more sophisticated system does not alter the essential aspects of the machine or the process, but merely provides a way of protecting against possible snagging and damage due to the passing of splices through certain parts of the mechanism.

An important aspect of this invention lies in the flexibility of application. A particular and unusual degree of flexibility and adaptability is provided in the structure of the twisting and cutting mechanism. Further discussion, particularly of the rack 56 and the cutting blades 56b will indicate how this flexibility may be utilized. As has been described, as the rack 56 rises, it initially twists the wires together, then simultaneously cuts one strand of each wire and then simultaneously cuts the remaining strand of each wire. Referring to FIGS. 5, the topmost of each pair of blades 56b cuts the wires in the topmost pinion 55, and the other pairs of blades similarly correspond to the remaining pinions. In each pair of blades 56b, the uppermost member of the pair cuts the first wire strand 33a and the second member of the pair cuts the second strand 33b.

It is apparent that as the rack 56 rises, it is necessary that no cuts be made until the twisting is complete and until the first blades of each pair are in position to simultaneously cut their corresponding wire section. Thus, the blades are so proportioned and placed along the rack 56 so that during the twisting step, blades pass the lower pinions 55 without cutting the wires therein. This is accomplished by having the blades pass these lower pinions at times when the grooves 55b and 55a are not holding the wires in the path of the blades. Broadly, it may be said that it is a requirement that the blades be so positioned along the rack that during the twisting action, when any blade is at the height of any pinion, a diameter of that pinion taken through the grooves 55a and 55b must be other than horizontal, and preferably is vertical. Thus, in FIG. 7 it is seen that the diameter across pinion 55 taken through the grooves 55a and 55b is substantially vertical, thus holding the wires 33a and 33b both out of the way of any blade 56b that would be passing the pinion at that moment.

It is apparent that given the dimensions for any cutting and tieing mechanism, the location of the blades can be easily calculated in terms of the linear distance along the teeth of the rack and the circumference of the toothed gear 55, and that the exact spacing will vary with each different construction. For example, considering a three wire tier and cutter, the following important dimensions can be used to achieve this required condition. The effective diameter, that is, the root diameter of the gear teeth, of each pinion is 1.5 inches. The vertical center line distance between each of the pinions 55 is 7.4613 inches. When the rack is positioned vertically with respect to the pinions so that the uppermost edge of the uppermost cutting blade 56b is 4.25 inches below the center line of the lowermost pinion 55, the grooves 55a and 55b of each of the pinions 55 are aligned so that the diameter drawn between them on each pinion is horizontal. Each individual cutting blade 56b is 0.75 inch in vertical dimension. The spacing between the bottom of one of a pair of cutting blades and top of the other of that pair is 2.0 inches. The distance between the bottom of the lower one of a pair of cutting blades and the top of the top cutting blade of the next succeeding pair of blades below is 3.75 inches. That is, starting down the dimensions from the top most individual blade shown in FIG. 5a, there is a 0.75 inch blade followed by a 2.0 inch gap, followed by an identical length blade, followed by a 3.75 inch gap before the next blade starts.

No limitation is intended by virtue of these exact recited dimensions; they are included only to describe one possible lay-out of a system, and it is apparent that computational and experimental methods can be utilized to provide the proper dimensions for structures having different base dimensions. It is convenient to have the blades adjustably mounted in the rack so that they can be moved as required while the system is being adjusted.

Another aspect of flexibility lies in the number of twists that are possible. As described above, the length of travel of the toothed rack before the sets of blades come into play determines the number of twists. The mechanism can be readily modified to provide different number of twists by providing a mechanical stop which limits the downward extension of the rack in its lowermost position. Thus, it is desirable to have a rack of sufficient length so that for example between one and three full twists may be made before the blades contact the wire. Thus, by positioning a bottom stop and thus changing the number of twists, wire of different properties can be handled. For example, wire of larger diameter, that is, lower gauge number, may not take as much cold working as thinner wire.

Other refinements of a practical nature have been found valuable, and while they do not go to the essentials of the main invention, they may in themselves be of inventive interest. The utilization or failure to utilize these additional refinements does not affect the essential operability of the machine.

For example, it is recalled that the rack 56 makes two discrete upper motions, the first such motion being sufficient to rotate the pinions one half turn, and the other stroke being full. It is appreciated that the first stroke should be accurate in its length so that the groove 55b is accurately aligned with the inclined guide 51a. A convenient way to do this is to provide a separate actuator with its own mechanical stops, and have the sequenced operation operate that first actuator, and hydraulic cylinder, so that it raises the rack only the short initial distance. Then, when the full stroke is required, a separate hydraulic cylinder provides this stroke.

Another modification involving essentially engineering practice relates to the tensioning and guide means as shown and described in connection with FIGS. 1a and 1b. It has been found that the exact number and arrangement of tension and guide pulleys 39a as shown and described is not essential to the operation. It has been found that there is enough drag in the system without the use of these rollers, or without the use of all of them, to provide enough wire tension. However, the use of threading through the rollers 39a is still preferred because it provides a required tension if the reel runs out while an automatic tie is being made. Thus, the arrangement of guide and tension pulleys 39a as shown is satisfactory. Some tension means is highly desirable to provide tension when a reel has run out, and during phases of operation when no reel has run out, the tension means may be taken to mean the normal amount of drag affecting the wire, including such things as the friction in the mounting of the spools, and the drag due to the bending of the wire around the corners.

The invention is not of course limited to a three wire tie, such as is illustrated in FIG. 2b. Different number of wires may be used. For example, a four wire structure has been designed, and the same principles that apply to the three wire embodiment shown also apply to those having different numbers of tieing wires.

In broad terms, the operation may be described as follows. The ram is withdrawn behind the load chute. The strands of wire running from spool to spool run through the baling chamber and across it in front of the load chute and are more or less taut around the corners of the aperture provided for their passage in the sides of the baling chamber. The ram starts to make a bale from the material that enters the baling chamber from the load chute. As the ram in its forward strokes makes the bale, the bale presses against the wires passing through the baling chamber and wire is pulled off the spools on both sides of the machine. The wire is carried forward by the pressure of the bale forming an open U-shaped loop, with the closed end of the loop at the front of the bale. The wire runs across the front of the bale and across the sides, but not across the back.

When a bale of full length is made, the ram goes to its fully extended forward position. This lines up the openings transversely across the ram with the wire carrier. The ram is locked in this forward position.

The wire which had originally been passed just transversely across the baling chamber now has sections which run a substantial distance longitudinally, that is, along the baling chamber. A section of this wire is now extended in front of both clamping pulleys of the extended portions of the wire carrier. Another section of wire, on the other side of the bale, extends close to and aligned with the inclined wire guide in the twisting and cutting mechanism. The wire hooks start down and force that section of the wire nearest the twisting and cutting mechanism into the grooves in the pinions aligned with the wire guides. The rack then makes a short upward stroke just sufficient to rotate the pinions one half turn and bring the other dimetrically opposed empty groove into alignment with the wire guides. The rotational force is kept on the wire hooks so that the wire stays in contact with the first section of wire and follows it.

The wire carrier now starts to travel across the baling chamber, passing through the openings in the ram provided for it. The carrier transports the second section of wire into the inclined wire guides and then into the grooves presented for it. A transverse U-shaped formation of wire is thus formed. This stage in wire placement is shown in FIG. 2a. This stage in the cycle as it relates to the position of the twisting and cutting mechanism is shown in FIG. 5c, where it is noted that the extended fingers of the wire hooks, still in contact with the first wire section, now extend between both wire sections.

The rack now makes its full upward stroke, rotating the pinions and thus twisting the wire on each side of the pinion, and then, by continuing the stroke, cutting first one section and then the other section of the wires between the toothed sections of the pinion. The condition of the wire after this stage is schematically shown in FIG. 2b. It will be seen that a closed loop or tie has been made and fastened around the bale with each wire, and also the original length of wire connecting the two spools has been joined with the rearmost twist or knot.

The extended fingers of the wire hooks remain in place during the twisting operation so as to confine the twists.

After the wire carrier has been withdrawn, a ram is unlocked and withdraws to its fully retracted position. The wire hooks then raise and strip the wires out of the grooves. After the next bale has been partially made by the renewed bale making cyclic operation of the ram and the forward motion of the bale has pulled the remaining twists or ties clear of the twisting and cutting mechanism, the rack returns. The entire cycle is then complete.

I claim:

1. A bale tying apparatus for use with a baler, said baler including a baling chamber having sides, a ram movable along and within said baling chamber, means to move said ram, and a load chute for loading material to be baled into said baling chamber, said bale tying apparatus comprising:
  a. wire supply means on each side of said baling chamber, said wire being connected to each said supply means and passing through and across said baling chamber in front of said load chute;
  b. a wire carrier on one side of said baling chamber, means to selectively move said wire carrier across and through said baling chamber ahead of said load chute, an extended portion on said wire carrier to contact a first section of said wire when said first section of wire is extended in front of said wire carrier, and to carry said first section of wire across and through said baling chamber; and
  c. a twisting and cutting mechanism on the other side of said baling chamber opposite said wire carrier, comprising:
    1. a rotatable pinion having a pair of diametrically opposed grooves, said grooves each adapted to receive a section of wire, said grooves and the axis of rotation of said pinion being along said baling chamber in the direction of movement of said ram;
    2. means to carry a second section of wire into one of said grooves;
    3. means to rotate said pinion to provide a twist on each side of said pinion in said wire sections lying in said grooves; and
    4. means to first cut said wire section in one of said grooves and then cut the other said wire section in the other of said grooves.

2. A bale tying apparatus as set forth in claim 1 wherein said ram includes an opening therethrough extending across said baling chamber and dimensioned to permit said wire carrier to pass therethrough when said ram is positioned along said baling chamber with said opening opposite said wire carrier, said ram having a forward face, a slot in said ram face extending across said baling chamber and communicating with said opening in said ram to permit the passage of a wire therethrough.

3. A baling apparatus as set forth in claim 2 wherein ram locking means are provided, said ram locking means selectively locking said ram against motion in a position wherein said opening in said ram is opposite said wire carrier.

4. A bale tying apparatus as set forth in claim 1 wherein each said wire supply means comprises a spool of wire mounted for free rotation on a spool support.

5. A bale tying apparatus as set forth in claim 1 wherein said extended portion on said wire carrier comprises clamping pulleys to carry said wire into said cutting and twisting mechanism, and said extended portion also is provided with a retaining pin to keep said extended portion in contact with said wire when said wire carrier is retracting across said baling chamber.

6. A bale tying apparatus as set forth in claim 1 wherein in said twisting and cutting mechanism said rotatable pinion is provided with gear teeth, said gear teeth being bifurcated to form two axially displaced gear sections, and said grooves in said pinion extending through said toothed gear sections of said pinion, and said means to rotate said pinion comprises a toothed linearly movable rack.

7. A bale tying apparatus as set forth in claim 6 wherein said means to cut said wire sections comprises a cutting blade mounted on said rack and so positioned as to pass between said gear sections.

8. A bale tying apparatus as set forth in claim 6 wherein said means to carry said second section of wire into one of said grooves comprises a wire hook, said wire hook being pivotally mounted, and provided with an extended finger at one end thereof, said extended finger contacting said second section of wire when said wire hook is rotated.

9. A bale tying apparatus as set forth in claim 8 wherein a said wire hook is provided on each side of said pinion and is adapted to remain in contact with said second section of wire during said twisting and cutting, whereby said twists in said wire are physically constrained between said extended finger and said pinion.

10. A bale tying apparatus as set forth in claim 9 wherein said wire hook is provided at the end remote from said extended finger with an actuator bar, and means to selectively move a said actuator bar.

11. A bale tying apparatus as set forth in claim 6 wherein a plurality of wires are provided across said baling chamber in spaced parallel relationship, and each of said wires has provided for it an extended portion on said wire carrier, and the twisting and cutting mechanism is provided with a said pinion and said means to carry a said second section of wire into one of said grooves, and said rack is provided with a plurality of said cutting blades, a pair of cutting blades being provided on said rack for each of said plurality of wires, each of said blades being positioned along the lower length of said rack, the initial movement of said rack rotating said pinions to twist said wires and the subsequent movement of said rack bringing said cutting blades in contact with said wires to cut them.

12. A bale tying apparatus as set forth in claim 11 wherein said cutting blades are so spaced along said rack that the first of each pair of said cutting blades contacts one section of each of said plurality of wires, simultaneously after said twisting is completed, and the second of each of said pairs of cutting blades then contacts the remainig section of each of said plurality of wires.

13. A method of tying a bale of compressed shredded material made in a baler including a baling chamber having sides, a ram movable along and within said baling chamber, means to move said ram, and a load chute for loading material to be baled in said baling chamber, comprising:
  a. providing a wire across and through said baling chamber in front of said load chute;
  b. admitting material to be baled into said baling chamber through said load chute, forming a bale by operating said ram, said bale being formed pushing said wire ahead of it so as to form an open U-shaped loop around the front and sides of said bale;
  c. carrying a section of the wire on one side of said bale into a groove in a rotatable pinion;
  d. rotating said pinion 180°;
  e. carrying a section of wire from the other side of said bale through and across said baling chamber into close proximity with said first section of said wire, and carrying said second section of wire into a groove in said pinion;
  f. rotating said pinion to twist said sections of wire together on each side of said pinion while maintaining extended fingers in place on each side of said pinion to constrain said twists; and
  g. cutting said wire sections between said twists, whereby a closed loop of wire is provided completely around said bale and said wire provided across said baling chamber is twisted together to form an integral length of wire preparatory for the formation of the next bale.